Feb. 24, 1970   J. MacDONALD D. SUTTON ET AL   3,497,165
FLUID FLOW DUCT INCLUDING THRUST REVERSING MEANS
Filed Aug. 14, 1967                                        2 Sheets-Sheet 1
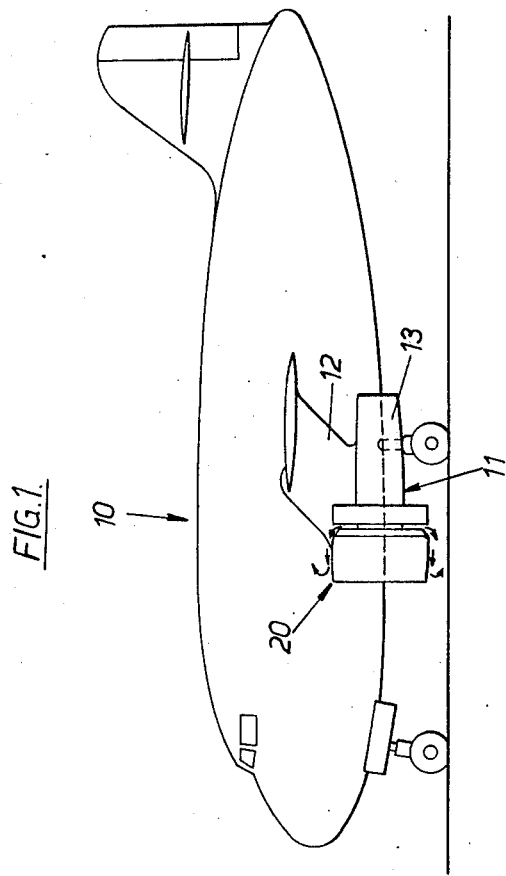

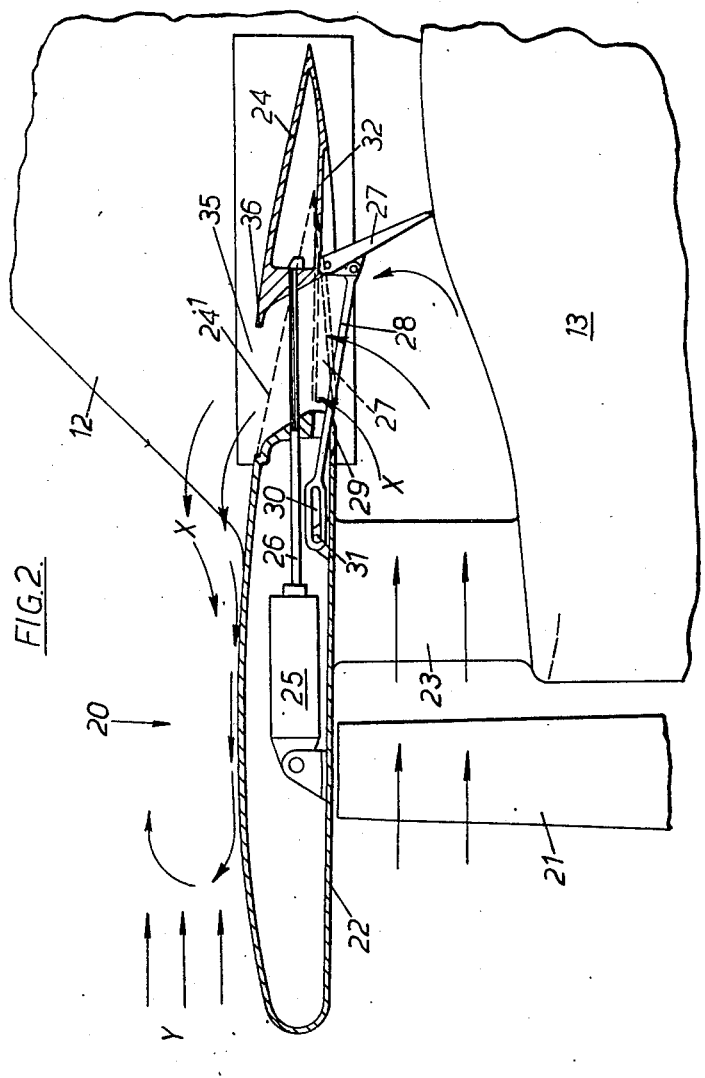

United States Patent Office 3,497,165
Patented Feb. 24, 1970

3,497,165
FLUID FLOW DUCT INCLUDING THRUST REVERSING MEANS
Julian MacDonald Davison Sutton and Connell Frederick Bee, Nottingham, and James Oswald Mortlock, Derby, England, assignors to Rolls-Royce Limited, Derby, England, a British company
Filed Aug. 14, 1967, Ser. No. 660,442
Claims priority, application Great Britain, Sept. 12, 1966, 40,710/66
Int. Cl. B64d 33/04
U.S. Cl. 244—53          12 Claims

ABSTRACT OF THE DISCLOSURE

Thrust reversal in a flow duct e.g. of a ducted fan is effected by directing the fluid flow through an annular gap in the duct wall in such a way that it is constrained by the Coanda effect to flow upstream over the external surface of the duct wall.

---

This invention relates to fluid flow ducts including thrust reversing means.

According to the invention there is provided a fluid flow duct having a duct wall, means defining an annular circumferentially extending opening in the duct wall, said opening being substantially free of obstruction, thrust reversing means in said opening, means for moving the thrust reversing means between an inoperative position in which fluid flow through the duct is substantially undeflected and a thrust reversing position in which said fluid flow is directed through said opening, said means defining the annular circumferentially extending opening and said external surface of the duct wall being continuous, substantially smooth and substantially free from obstruction whereby all the fluid flow through said opening is constrained by the Coanda effect to flow over the external surface of the duct wall in a direction substantially opposite to the direction of fluid flow in the duct.

Thus it will be realized that the lateral surfaces at said opening are of streamline configuration and extend outwardly and forwardly.

The invention finds particular application to thrust reversing means for ducted fans, for example, gas turbine-driven fans mounted on aircraft. In conventional designs of thrust reversing equipment, used, for example, on gas turbine engines, the gases deflected when thrust reversal occurs are hot turbine exhaust gases, and it is normally arranged that these gases are given, in addition to a forward component, an outward component to direct them clear of the engine casing and any other surrounding structure, to avoid the adverse effects which the hot gases would have on such structure.

Thrust reversers on aircraft gas turbine engines are, of course, usually operated when the aircraft is on the ground, and a problem which arises, largely due to the outward component given to the forwardly directed gases under reverse thrust conditions, is that of ground erosion. The gases impinge on the ground and dislodge stones and other debris therefrom and there is a risk of such debris being drawn into the engine intake, with damaging results. This problem is particularly acute in the case of low slung gas turbine engines, for example, those mounted by pylons beneath aircraft wings, which have relatively small ground clearance. Moreover, where such gas turbine engines have ducted fans associated therewith, the problem is aggravated by the fact that the fan casing is of relatively large diameter with a ground clearance which is even smaller than that of the gas turbine engine.

The present invention enables thrust reversal to be applied to a ducted fan, even when it is mounted close to ground, while avoiding substantial ground erosion. The Coanda effect operates to maintain the fluid flow over the external surface of the duct wall when the thrust reversing means is operative, and the outward flow component referred to above is minimised. It will be appreciated that, in the case of a fan efflux, which is at relatively low temperature, there is no risk of damage to the external surface of the duct wall due to the flow of the fan efflux thereover.

The thrust reversing means preferably include an axially movable annular duct wall portion which in the inoperative position forms a continuous part of the duct wall and in the thrust reversing position is separated from the remainder of the duct wall by the said annular opening.

The thrust reversing means may also include a plurality of hinged deflectors which in the inoperative position of the thrust reversing means form part of the internal surface of the duct wall and which in the thrust reversing position extend across the duct downstream of said annular opening to guide substantially all the fluid flow through said opening. Each hinged deflector may be pivotally mounted on the movable wall portion of the annular duct.

A respective linkage preferably connects each hinged deflector to the fixed part of the duct wall so that the deflectors are moved automatically into their thrust reversing positions when said duct wall portion is moved into its thrust reversing position. Each said linkage may comprise a lost motion link.

The movable annular duct wall portion is preferably provided at its outer surface with a circumferential lip which in the thrust reversing position of said wall portion projects into the annular opening and assists the deflection of fluid flowing therethrough.

The annular duct wall portion is preferably movable axially by means of one or more hydraulic or pneumatic rams. A plurality of said rams may be located within the fixed part of the duct wall, each ram being connected to the movable wall portion by means of an actuating rod which, in the thrust reversing position, extends axially across said annular opening.

In its preferred application to a ducted fan, the duct according to the invention includes a fan mounted co-axially within the duct upstream of the thrust reversing means. The fan is preferably driven by a gas turbine engine mounted downstream of and co-axially with the fan.

The invention also includes an aircraft having at least one ducted fan gas turbine engine as defined in the preceding paragraph, said engine being mounted in a pod beneath a wing of the aircraft.

The invention will be described, merely by way of example, with reference to the drawings accompanying the provisional specification, in which:

FIGURE 1 is a side elevation of an aircraft provided with ducted fan power plant incorporating the invention, and FIGURE 2 is a diagrammatic section through part of a ducted fan according to the invention, mounted on the aircraft shown in FIGURE 1.

Referring to FIGURE 1, an aircraft 10 has wing-mounted ducted fan power plant 11, one only of which is shown in FIGURE 1, slung beneath the wings of the aircraft 10 on respective pylons 12.

Each ducted fan power plant 11 comprises a gas turbine engine mounted in a pod and indicated generally at 13 in combination with a ducted fan unit 20 mounted at the forward end of the gas turbine engine 13 and arranged to be driven thereby.

Referring to FIGURE 2, the ducted fan unit 20 is shown as comprising a single stage fan 21 drivingly connected to the low pressure compressor shaft (not shown) of the gas turbine engine 13. The fan duct in which the fan 21 is mounted is defined by a substantially cylindrical duct wall 22 arranged co-axially with the axis of rotation of the fan 21. The duct wall 22 is supported from the casing of the gas turbine engine 13 by a plurality of struts 23 which are streamlined in section and act as flow straightening vanes for the efflux from the fan 21.

The duct wall 22 has a fixed part provided at its downstream end with an axially movable annular duct wall portion 24 which is movable axially relative to the fixed part of the duct wall 22 by means of a plurality of pneumatic or hydraulic rams 25 located within the fixed part of the duct wall 22. Each ram 25 is connected to the wall portion 24 by a respective actuating rod 26. The rams 25 are operated in unison to move the wall portion 24 between an inoperative position, shown in broken lines at 24', and a thrust reversing position, shown in full lines.

A plurality of hinged deflector flaps 27 are pivotally mounted on the internal surface of the movable wall portion 24, the hinge of each flap 27 being at the upstream end of the portion 24. One end of a respective link 28 is pivotally connected to each deflector flap 27. Each link 28 extends through an aperture 29 in the fixed part of the duct wall 22, the other end of the link 28 having an axially extending slot 30 therein in which a pin 31 located internally of the duct wall 22 is engaged. The pin 31 and slot 30 comprise a lost motion connection between the link 28 and duct wall 22. This lost motion connection is such that, when the annular wall portion 24 is in its inoperative position 24', the link 28 moves the hinged deflector flap 27 to and retains it in an inoperative position 27', in which it lies within an annular recess 32 provided in the duct wall portion 24 and is flush with the internal surface of the duct wall portion 24. When, however, the annular wall portion 24 is in its thrust reversing position (full lines), the links 28 move the deflector flaps 27 into and retain them in thrust reversing positions in which they extend across the downstream end of the fan duct.

The arrangement described above will be seen to constitute a thrust reversing means for the ducted fan, the operation of which will be clear from FIGURE 2 and the foregoing description.

When the thrust reversing means is in its inoperative position 24', 27' (broken lines) the fan efflux is directed rearwardly between the casing of the gas turbine engine 13 and the duct wall portion 24 to provide forward thrust on the aircraft 10. When it is desired to reverse the thrust produced by the ducted fan, for example, to produce braking forces on the aircraft on landing, the rams 25 are operated to extend the actuating rods 26, so that the annular wall portion 24 and deflector flaps 27 are moved to the positions shown in full lines. In these positions, the deflector flaps 27 effectively block the rearward passage of the fan efflux between the casing of the gas turbine engine 13 and the wall portion 24, and, at the same time, an annular circumferentially extending opening 35 is formed between the fixed part of the duct wall 22 and the wall portion 24 the lateral surfaces at said opening being of streamline configuration and extending outwardly and forwardly. The deflector flaps 27 deflect the fan efflux through the annular opening 35, the path of the fan efflux being indicated by the arrows X in FIGURE 2.

The outer surface of the annular duct wall portion 24 is provided at its upstream end with a circumferential lip 36 which, in the thrust reversing position of the wall portion 24, projects into the annular opening 35 and assists in deflecting the fan efflux forwardly with respect to the aircraft.

Once deflected forwardly, the fan efflux is deflected slightly outwardly from the fixed point of the duct wall 22. This creates an area of low pressure on the fixed part of the duct wall substantially adjacent the upstream end of the circumferentially extending opening 35. Ambient air then acts upon the fan efflux and causes it to follow the contour of the fixed part of the duct wall 22. The path of the fan efflux, shown by arrows X, is by virtue of the Coanda effect. Thus all the fan efflux is constrained to follow closely the contour of the external surface of the duct wall 22 and to flow forwardly, that is, in a direction substantially opposite to the original direction of flow of the fan efflux.

It will be appreciated that, in order to encourage the operation of the Coanda effect in the manner described above, it is essential that the external surface of the duct wall 22 be smooth and as free as possible of obstruction, as otherwise turbulence will occur and the fan efflux will cease to follow the contour of the duct wall 22. The provision of a groove for receiving the circumferential lip 36 of the annular duct wall portion 24 in the inoperative position has little or no effect in the operation of the Coanda effect. In fact the size of both the circumferential lip 36 and the corresponding groove have both been exaggerated in FIGURE 2 for the sake of clarity.

In operation, the thrust reversing means will be used when the aircraft is moving forwardly over the ground, and it will therefore be apparent that, as a result of the air flow indicated by arrows Y (FIGURE 2) over the external surface of the duct wall 22, the forwardly directed fan efflux X, after travelling forwardly some distance close to the external surface of the duct wall 22, will, in effect, be "peeled away" from the duct wall 22 and directed rearwardly. This will occur generally before the fan efflux X reaches the intake end of the fan. The resultant effect, as indicated by the arrows, is that braking is produced by the reversal of the fan efflux, but the net outward flow of the fan efflux on reversal is kept to a minimum. Consequently, the disturbance caused to loose particles on the ground beneath the aircraft is relatively slight, even though the fan units 20 have a relatively small ground clearance, as is clear from FIGURE 1.

Although specifically described with reference to engines 11 mounted in pods slung beneath aircraft wings, it will readily be appreciated that the invention is equally applicable to any mounting location for fluid flow ducts.

We claim:

1. A fluid flow duct having a duct wall, means defining an annular circumferentially extending opening in the duct wall, said opening being substantially free of obstruction, with its lateral surfaces being of streamline configuration and extending outwardly and forwardly, thrust reversing means in said opening, means for moving the thrust reversing means between an inoperative position in which fluid flow through the duct is substantially undeflected and a thrust reversing position in which said fluid flow is directed through said opening, said means defining the annular circumferentially extending opening and said external surface of the duct wall being continuous substantially smooth and substantially free from obstruction whereby all the fluid flow through said opening is constrained by the Coanda effect to flow over the external surface of the duct wall in a direction substantially opposite to the direction of fluid flow in the duct.

2. A duct as claimed in claim 1 in which the thrust reversing means includes an axially movable annular duct wall portion which in the inoperative position forms a continuous part of the duct wall and in the thrust reversing position is separated from the remainder of the duct wall by the said annular opening.

3. A duct as claimed in claim 2 in which the thrust reversing means also include a plurality of hinged deflectors which in the inoperative position of the thrust reversing means form part of the internal surface of the duct wall and which in the thrust reversing position extend across the duct downstream of said annular opening to guide substantially all the fluid flow through said opening.

4. A duct as claimed in claim 3 in which each hinged deflector is pivotally mounted on the movable wall portion of the annular duct.

5. A duct as claimed in claim 4 in which a respective linkage connects each hinged deflector to the fixed part of the duct wall and moves the deflectors automatically into their thrust reversing positions when said duct wall portion is moved into its thrust reversing position.

6. A duct as claimed in claim 5 in which each said linkage comprises a lost motion link.

7. A duct as claimed in claim 2 in which the movable annular duct wall portion is provided at its outer surface with a circumferential lip which in the thrust reversing position of said wall portion projects into the annular opening and assists the deflection of fluid flowing therethrough.

8. A duct as claimed in claim 2 in which at least one hydraulic or pneumatic ram is provided and is connected to the annular duct wall portion to move said portion axially.

9. A duct as claimed in claim 8 in which a plurality of said rams are located within the fixed part of the duct wall and a respective actuating rod connects each ram to the movable wall portion, each said actuating rod extending axially across said annular opening in the thrust reversing position of the movable wall portion.

10. A duct according to claim 1 including a fan mounted coaxially within the duct upstream of the thrust reversing means.

11. A duct as claimed in claim 10 including a gas turbine which is drivingly connected to the fan and which is mounted downstream of and coaxially with the fan.

12. An aircraft having at least one duct and gas turbine engine as claimed in claim 1, and at least one pod supported beneath a wing of the aircraft and housing said duct.

References Cited

UNITED STATES PATENTS

| | | | |
|---|---|---|---|
| 3,036,431 | 5/1962 | Vdolek | 60—229 |
| 3,262,268 | 7/1966 | Beavers | 60—226 |
| 3,262,271 | 7/1966 | Beavers | 60—226 |
| 3,280,562 | 10/1966 | Theits et al. | 60—230 |

MILTON BUCHLER, Primary Examiner

JAMES E. PITTENGER, Assistant Examiner

U.S. Cl. X.R.

60—230; 239—265.29